Patented May 27, 1952

2,597,996

UNITED STATES PATENT OFFICE 2,597,996

NONSOLVENT ADHESIVE

Ralph Albert Johnson, Port Allegany, Pa., assignor to Pittsburgh Corning Corporation, a corporation of Pennsylvania No Drawing. Application June 14, 1949,
Serial No. 99,111

2 Claims. (Cl. 260—28.5)

This invention relates to adhesive compositions which are characterized by permanent masticity and dimensional stability under room temperatures, in the absence of bearing pressures.

The invention is directed specifically to an adhesive for the purpose of connecting cellular glass or other brittle insulative materials. Cellular glass is a highly cellulated non-elastic glass product which possesses excellent insulative properties but, by nature of its structure, is fragile and readily ruptured under concentrated pressures. When blocks of this material are assembled as an insulating wall, the adhesive used must retain all its characteristics, present when applied, throughout the life of the structure.

When the insulative material is used as a filler between rigid load bearing materials in forming pre-fabricated building panels, the adhesive must not only adhere to the cellular glass and to the coating materials but must also permit relative movement between the filler and the coating materials, or between the individual blocks forming the filler, to prevent fracture or tearing of the filler. At the same time, the adhesive must not shrink or crack or exhibit cold flow characteristics so as to open up the joints and permit entrance of moisture, odors or vermin.

Likewise, cellular glass or like materials are selected because of their flame proof, vapor proof and non-absorption qualities; hence, an adhesive for assembling such material must also exhibit such qualities in order to not impair the completed structure.

This invention is based upon the discovery that melted asphalt blended with suitable amounts of coumarone-indene resin and microcrystalline wax, and thereafter mixed with chlorinated wax liquid at room temperatures, produces a nonsolvent adhesive which is characterized by fire resistance, vapor tightness, permanent masticity, and resistance to cold flow at room temperatures and atmospheric pressures, when not exposed to direct rays of the sun. Furthermore, the viscosity can be varied within considerable limits by varying the amounts of chlorinated wax used.

The terms "permanent masticity" and "resistance to cold flow," as used herein, are in reference to an adhesive composition used in connection with non-load bearing materials. Hence, "permanent masticity" refers to the characteristic of the adhesive of not hardening, cracking or shrinking away from the insulation material during temperature changes within the ranges specified. Also, "resistance to cold flow" designates the resistance of the adhesive to separation from, or have movement between the adjacent materials, cellular glass and protective coatings, while remaining viscous.

An adhesive for the purpose described may be applied by trowel, caulking gun, brushing or dipping; the selection of the method of application being left to the user. Whenever brushing or dipping is resorted to, the adhesive must be heated to about 150° F. Hence, an adhesive which at room temperature might be applied with a trowel or gun, would need to be heated for a brushing or dipping application. However, when the adhesive is later cooled to room temperature, it would exhibit the same previously enumerated characteristics as before heating.

The asphalt used is common petroleum asphalt having a ball and ring melting point of between 110° F. and 150° F. This is a commercial grade of asphalt and may be purchased on the open market.

The coumarone-indene resin selected is a modified resin having a ball and ring melting point of about 130–150° F. A commercial form is known as "Nuba" wax, and is entirely suitable for the purpose.

Microcrystalline wax is a commercial petroleum wax and one selected to be about the melting point of the asphalt will be suitable.

The asphalt, resin and wax are melted and blended. The most satisfactory proportions for use with cellular glass was found to be a 5:5:1 mix of these materials. These, when blended with chlorinated wax in proportions of 2 parts wax to 3 parts of the above mix, give excellent trowelability at room temperatures.

The chlorinated wax used is a paraffin wax containing about 40% chlorine. A higher percent of chlorine is not recommended as it results in a more or less solid wax, whereas 40% chlorine results in a liquid form of the wax at room temperature.

Resistance to cold flow may be retained with permissible variations in the hot mix of 5:5:1 proportions of asphalt, resin and microcrystalline wax, respectively, when the proportions by weight are within the range of:

| | Parts |
|---|---|
| Asphalt | 4 to 6 |
| Resin | 6 to 4 |
| Microcrystalline wax | 1½ to 1 |

The proportions of chlorinated wax to the asphalt, resin, microcrystalline wax hot mix may vary in proportion by weight within the following range:

| | Parts |
|---|---|
| Chlorinated wax | 4 to 2 |
| Asphalt, resin, wax mix | 6 to 8 |

A satisfactory formulation giving good resistance to cold flow and excellent trowelability consists of the following proportions by weight:

| | Parts |
|---|---|
| Asphalt | 5 |
| Coumarone-indene resin | 5 |
| Microcrystalline wax | 1 |
| 40% chlorinated paraffin wax | 7 |

The resistance to cold flow and permanence of masticity are retained throughout the above ranges. The viscosity of the adhesive may be varied by changes in the amount of chlorinated wax used while retaining the 5:5:1 proportions of the hot mix, or the proportions of the hot mix may be varied within the ranges given, with retention of the proportion of chlorinated wax.

In the preparation of the adhesive, the asphalt is first melted and the resin and microcrystalline wax slowly blended therewith while continuing the heating. The heating is then discontinued and the chlorinated wax is blended in, using proportions within the above range, to secure the desired viscosity.

For some applications, it may be desirable to use a filler in the adhesive. I have used asbestos floats, such as the grade 7 variety common to the trade. Other fillers of asbestos, or such as mica, fine silica and similar materials may also be used.

I claim:

1. An adhesive for assembling rigid non-load bearing insulative materials and characterized by its permanent masticity, vapor tightness and resistance to cold flow at normal room temperatures, comprising 5 parts by weight of asphalt, 5 parts by weight of coumarone-indene resin, 1 part by weight of micro-crystalline wax, and 7 parts by weight of 40% chlorinated paraffin.

2. An adhesive for assembling rigid non-load bearing insulative materials and characterized by its permanent masticity, vapor tightness and resistance to cold flow at normal room temperatures consisting of the following in parts by weight:

| | |
|---|---|
| Asphalt | 4 to 6 |
| Coumarone-indene resin | 6 to 4 |
| Microcrystalline wax | 1½ to 1 |
| 40% chlorinated paraffin wax | 7 to 2 |

RALPH ALBERT JOHNSON.

REFERENCES CITED

The following references are of record in the file of this patent:

UNITED STATES PATENTS

| Number | Name | Date |
|---|---|---|
| 2,142,039 | Abrams et al. | Dec. 27, 1938 |

OTHER REFERENCES

"The Chemistry and Technology of Waxes," by A. H. Warth, published 1947 by Reinhold Publishing Corp., page 264.